Sept. 10, 1929.  H. J. TIETZ  1,727,573
ELECTRIC HEATER
Filed Feb. 10, 1928
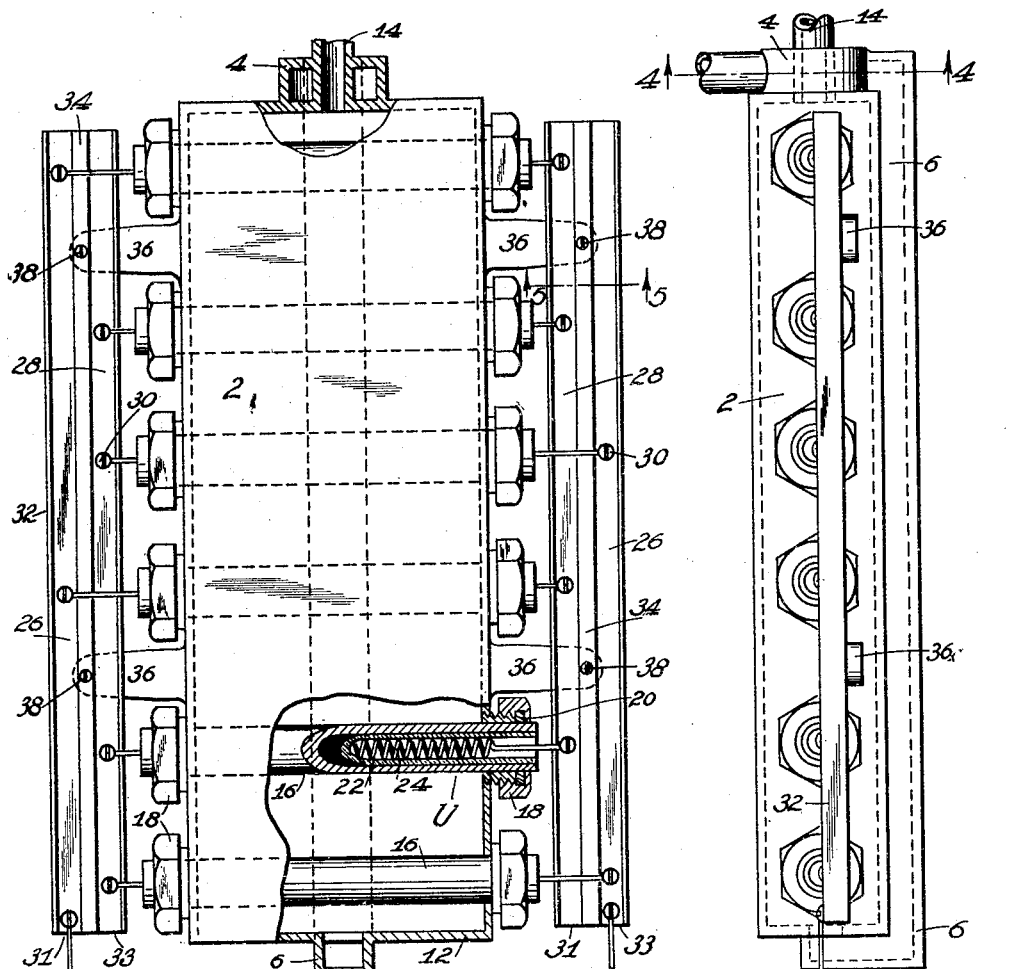
Fig. 1.
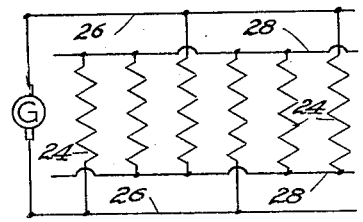
Fig. 2.
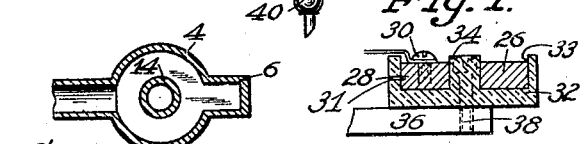
Fig. 5.
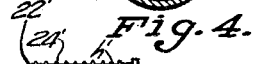
Fig. 4.
Fig. 8.
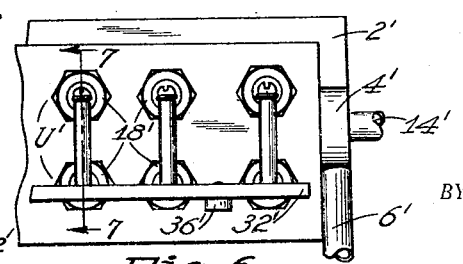
Fig. 7.  Fig. 6.
Fig. 3.
INVENTOR.
HERMAN J. TIETZ.
BY
ATTORNEY.

Patented Sept. 10, 1929.

1,727,573

UNITED STATES PATENT OFFICE.

HERMAN J. TIETZ, OF SAN PEDRO, CALIFORNIA.

ELECTRIC HEATER.

Application filed February 10, 1928. Serial No. 253,369.

My invention relates to electric heaters and more particularly to preferably thermostatically controlled electric fluid heaters adapted for household purposes such as automatically heating the water so that ample hot water may be had for instant use any time the faucet is turned on, or it may be used without any automatic control.

To this end my invention comprises a casing of any preferred shape and constructed of any desired material, and, if desired covered with heat insulating material, said casing being equipped with a set of heating elements in the form of a metallic tube of copper or similar heat conducting material, which tube has positioned therein an electric heating coil, or other heating element properly insulated from the tube in any preferred way, such as a tube of glass, mica or the like, said coils or other elements being preferably connected in series-parallel by means of a set of bus bars, insulated from each other and also from the casing, which casing is provided with any desired fluid circulating means associated with the household water supply, such as the conventional stand boiler.

It is also within the province of my invention to provide a novel form of heating element in the shape of a preferably cylindrical insulator, ground to receive any preferred form of heating coil, each end of which is threaded, through holes in said insulator.

The above and further objects and advantages of my invention, as will hereinafter more fully appear, I attain by the structure described in the specification and illustrated on the drawings, forming a part of my application.

Reference is had to the accompanying drawings, in which similar reference characters denote similar parts. In the drawings, Fig. 1 is a part sectional side elevational view of my invention, with parts broken away to disclose the internal construction.

Fig. 2 is an end elevational view of Fig. 1,

Fig. 3 is a diagrammatic view of the electric circuits for the heating coils or elements, Fig. 4 is a transverse cross-sectional view on the line 4—4, Fig. 2, looking in the direction of the arrows, Fig. 5 is a similar view on the line 5—5, Fig. 1, also looking in the direction of the arrows, Fig. 6 is a fragmentary end elevational view of a modified form of my invention, Fig. 7 is a cross-sectional view on the line 7—7, Fig. 6, looking in the direction of the arrows, and Fig. 8 is a fragmentary detail elevational view of another form of heating element.

Describing my invention more in detail, the main object of my invention is to provide an electric water heater, more especially adapted for household use whereby hot water may be available at all times, said heater being more especially adapted to be used in connection with a novel form of an automatic thermostatic switch which invention is the subject of a companion application filed Feb. 10, 1928, Ser. #253,370, or said heater may be used without an automatic control.

My novel form of electric water heater comprises a preferally rectangular or other shaped casing or tank 2, constructed of any preferred material, and if desired, equipped with heat insulating material to reduce heat losses due to radiation to a minimum.

Any preferred means for producing a fluid circulation by means of convection currents through the heater may be provided. To this end, the casing 2 is equipped with a cold water inlet 4, associated by any preferred manner with the cold water system of the household connected to the city water supply. In the form of my invention depicted in Figs. 1 and 2, the inlet 4 is associated in any preferred way with a passage 6 leading to the end 12 of the casing 2. This passage extending along the outside of the casing 2 provides the same with cold water, the hot water being drawn off at the top, and preferably by means of the pipe 14 in concentric relation with the cold water inlet 4. In practice, the hot water pipe 14 in concentric relation with the cold water inlet 4, is associated with a thermostatic switch, which switch controls the electric circuits depicted in Fig. 3. It will of course be understood that any other fluid circulating means may be substituted for that just described and still remain within the province of my invention. Such a means is shown in Fig. 6, presently to be described.

One or more sets of electric heating units or elements, designated generally by the reference character U, extend transversely through the casing 2 to provide means for heating the fluid in said casing. Each of said units or elements comprises an outer tube or casing 16, preferably constructed of copper, and of any desired shape, said tube being held in place in the casing 2 by means of suitable slip joint nuts 18, or otherwise, a washer 20, of rubber, or other material, being positioned as shown and used to prevent leakage, or said tubes may be welded in place, as preferred.

Inside of each copper tube 16 is an electric insulating means, preferably in the form of a tube of glass, porcelain, mica or other insulating material 22; and inside the tube 22 is positioned the heating coil 24, or other element constructed of any preferred material. It will be clear, however, that any other form of electric heating unit may be substituted for that just described, and still remain within the spirit of my invention.

The means for supplying the coil 24 with electric energy may be any desired, but preferably that shown more particularly in Figs. 1 and 5. Such a means comprises sets of bus bars 26 and 28, positioned on each side of the casing 2, as depicted in Fig. 1, which bus bars are preferably in the shape of flat copper bars, to which the ends of the coils 24 are secured by any desired means, such as set screws 30. Of course, any other preferred means for detachably associating the coils with the bars 26 and 28 may be substituted therefor.

It will be clear that the bars 26 and 28 must be insulated from each other and from the tank 2. To this end a procelain insulator 32, probably shaped as shown and equipped with a partition 34, preferably integral therewith, is provided, and said insulator 32 is secured to each side of the casing 2 by means of the arms 36 associated with said casing in any manner desired, a set of countersunk bolts or other fasteners 38, passing through the partition 34, being used to secure the insulator 32 to the arms 36, the bus arms 26 and 28 being positioned within the cavities 31 and 33. Other insulating means for holding the bus bars to the casing 2 may of course be provided.

As shown in Fig. 3, the coils 24 are arranged in series-parallel by means of the bus bars 26 and 28, three coils being in series and in parallel with the remaining three coils, so that if one coil burns out the others will still function. It will be obvious, however, that any preferred number of such coils may be used, and any other manner of arranging the electric circuits may be substituted for those just described.

As shown in Figs. 1 and 2, a suitable drain cock 40 may be provided whereby the system may be drained from time to time. This drain cock may be associated with the passage 6 as shown or positioned at any desired point thereof.

In the form of my invention shown in Figs. 6 and 7, a double set of heating elements U' is provided for the casing 2', and the water circulating means is formed as a distinct and separate pipe connected to said casing, as shown. The cold water is introduced through the screw-threaded inlet 4', concentric with the hot water outlet 14', which outlet connects with the casing 2', and the inlet 4' connects with the passage 6' leading to the opposite end of the casing, a drain being positioned at any preferred point in the passage 6', if desired.

In this form of my invention one row of the heating units U' is in electrical connection with the heating coils precisely as in the other form of my invention, each additional element of the additional rows being correspondingly connected together as shown by means of a copper or other ferrule 25', in which is positioned the bolt 23', a bar 21' being used to connect the bus bar 26', with the corresponding unit above or below, the bus bar 28', positioned with the bus bar 26' in the insulator 32' as in the other form of my invention, the slip nuts 18' being also used as before. It will be clear that the number of units may thus be multiplied indefinitely, and the heating units U or U' associated with the tank as desired.

In Fig. 8 I have shown illustrated an especially useful means for providing the heat necessary to heat the water, said means, as demonstrated in practice, raising the efficiency of the apparatus at least ten percent. This means comprises an insulator 24', preferably of porcelain and threaded to receive the heating coil 22', each end of which is threaded or passed through holes h', said ends being connected to the bus bars as depicted in Fig. 1. It will thus be seen that the heat is directly communicated to the tubes 16, raising the efficiency of the apparatus to a marked degree.

While I have thus described my invention with great particularity, it will be clear that the same may be modified throughout a wide range. I, therefore, do not propose to be limited to the exact details of construction shown and described, but reserve the right in practice to make any and all modifications thereof that fall within the scope of the appended claims.

I claim as my invention:

1. A water heater comprising a tank, a plurality of tubes extending transversely through and projecting beyond the respective sides of said tank, means engaging the projecting ends of said tubes to connect same to said tank, a resistance coil in each of said tubes having at each end thereof a terminal projecting beyond said tube, means whereby electric energy may be supplied to said coils, and means for supporting said supply means insulatingly from said tank.

2. A water heater comprising a tank interposed in a liquid conduit, a plurality of hollow, open ended bodies extending transversely through said tank and projecting beyond the respective sides thereof, means engaging the projecting ends of said bodies to connect same in water-tight manner to said tank, electrical heating means within said bodies having terminals projecting beyond the projecting ends of said bodies, means whereby electrical energy may be supplied to said heating means, and means for insulatingly supporting said supply means in spaced relation to said tank, the terminals of said heating means connected to said supply means.

3. A water heater comprising a tank, a plurality of hollow, open-ended bodies extending through said tank and projecting beyond the respective sides thereof, heating coils in said bodies, and means for supplying electrical energy to said coils, comprising pairs of spaced bars, means connecting the heating coils to said bars, and means for supporting said bars insulatedly from each other and from said tank.

4. A water heating device comprising a tank having a hot water outlet at the top, means for supplying cold water to the bottom of the tank, a plurality of tubes extending through and projecting beyond said tank, means in said tubes to heat same, and means for supplying electrical energy to said heating means comprising conducting media and means for insulatingly supporting said conducting media in spaced relation to said tank.

5. A water heater comprising a tank having a hot water outlet at the top, means for conveying cold water about said hot water outlet and along the outside of said tank to the bottom thereof, heating means extending through said tank, and means insulatedly disposed on each side of tank for supplying electrical energy to said heating means.

In testimony whereof I have signed my name to this specification.

HERMAN J. TIETZ.